US006624681B1

(12) United States Patent
Loyer et al.

(10) Patent No.: US 6,624,681 B1
(45) Date of Patent: Sep. 23, 2003

(54) CIRCUIT AND METHOD FOR STOPPING A CLOCK TREE WHILE MAINTAINING PLL LOCK

(75) Inventors: Bruce A. Loyer, Austin, TX (US); Sridhar Subramanian, Sunnyvale, CA (US); Michael S. Quimby, Austin, TX (US); Niranjan Venigandla, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/918,209

(22) Filed: Jul. 30, 2001

(51) Int. Cl.[7] .................................................. G06F 1/04
(52) U.S. Cl. .......................... 327/297; 327/159; 327/155; 713/601; 331/1 A; 375/376
(58) Field of Search .......................... 327/146, 147–150, 327/153, 155–159, 161, 162, 165, 166, 291, 293, 295, 297, 564, 565, 373; 331/1 A, 18, 25, 45, 60–61, 74, DIG. 2; 375/371, 373–376; 365/233, 233.5; 326/41, 47, 49, 101; 713/601

(56) References Cited

U.S. PATENT DOCUMENTS

| 5,604,775 | A | * | 2/1997 | Saitoh et al. ................. 331/25 |
| 5,844,954 | A | * | 12/1998 | Casasanta et al. ............. 331/25 |
| 5,977,837 | A | * | 11/1999 | Byrn et al. .................. 327/115 |
| 5,999,025 | A | * | 12/1999 | New .......................... 327/156 |
| 6,021,506 | A | | 2/2000 | Cho et al. .................... 713/601 |
| 6,288,583 | B1 | | 9/2001 | Ozawa et al. ................ 327/113 |

\* cited by examiner

*Primary Examiner*—Minh Nguyen
(74) *Attorney, Agent, or Firm*—Meyertons, Hood, Kivlin, Kowert, & Goetzel, P.C.; B. Noël Kivlin

(57) ABSTRACT

A circuit and method for stopping a clock tree while maintaining PLL lock. A clock circuit includes a locked loop circuit and a clock tree distribution network. The locked loop circuit receives an input clock signal and generates a PLL output clock depending upon a feedback signal. The clock tree is coupled to the locked loop circuit and conveys the PLL output clock to a plurality of clocked circuit elements. The clock circuit further includes a gating circuit and a feedback delay circuit. The gating circuit is coupled between the locked loop circuit the clock tree distribution network and selectively inhibits the PLL output clock from clocking the clock tree distribution network. The feedback delay circuit provides the feedback signal, which represents a delayed version of the PLL output clock, during operation including when the gating circuit inhibits the PLL output clock from clocking the clock tree.

12 Claims, 4 Drawing Sheets

CIRCUIT AND METHOD FOR STOPPING A CLOCK TREE WHILE MAINTAINING PLL LOCK

BACKGROUND OF THE INVENTION

1. Field of the Invention

This invention relates to computer system power management and, more particularly, to clock tree starting and stopping.

2. Description of the Related Art

As computer systems have become more powerful, power management has become a more critical part of the overall system design. This may be especially true for systems that have portable applications. To reduce the power consumed by a computer system, many computer systems employ processors that are capable of entering a standby or low power mode when there is no demand on the processor for a specified duration. In addition, to further decrease the power consumed by a system, the same low power modes may be implemented for the chipsets that are associated with the processor.

There are many ways to place a system component into a low power mode. For integrated circuits using complementary metal oxide semiconductor (CMOS) technology, the time during a transition from a logic one to a logic zero and from a logic zero to a logic one typically consumes the most power since the most current is flowing in a particular circuit. Thus, one method of decreasing system power is to halt unnecessary switching. In clocked systems, the clock signal may be the source of most of the unnecessary switching during idle processing times.

When a clock signal is distributed throughout a system, the resulting clock distribution network is commonly referred to as a clock tree. Many systems take advantage of idle processing time by shutting down portions of the clock tree using clock gating techniques. However, depending on the complexity of the clock tree, it may be difficult to shut down portions of the clock tree due to factors such as added gate delays caused by multiple clock gating circuits. Alternatively, in some systems the entire clock tree is shut down. However, in systems that employ a clock generation circuit such as a phase locked loop (PLL), shutting down the entire clock tree may cause unacceptable delays when the system clock must be restarted.

SUMMARY OF THE INVENTION

Various embodiments of a circuit and method for stopping a clock tree while maintaining PLL lock are disclosed. In one embodiment, a clock circuit includes a locked loop circuit, such as a PLL, for example and a clock tree distribution network. The locked loop circuit is configured to receive an input clock signal and to generate a PLL output clock depending upon a feedback signal. The clock tree distribution network is coupled to the locked loop circuit and is configured to convey the PLL output clock to a plurality of clocked circuit elements such as flip-flops. The clock circuit further includes a gating circuit and a feedback delay circuit. The gating circuit is coupled between the locked loop circuit the clock tree distribution network. The gating circuit is configured to selectively inhibit the PLL output clock from clocking the clock tree distribution network. The feedback delay circuit is coupled to receive the PLL output clock and to generate the feedback signal which represents a delayed version of the PLL output clock. The feedback delay circuit is configured to provide the feedback signal during operation including when the gating circuit inhibits the PLL output clock from clocking the clock tree distribution network.

In one particular implementation, the delayed version of the PLL output clock is derived by adding a predetermined delay to the PLL output clock. The predetermined delay is substantially equal to a delay caused by propagation of the PLL output clock through the clock tree distribution network. The delayed version of the PLL output clock is derived by a combination of propagating the PLL output clock through a predetermined number of feedback logic gates and by a predetermined routing of signal traces connecting those feedback logic gates.

Figure 1:
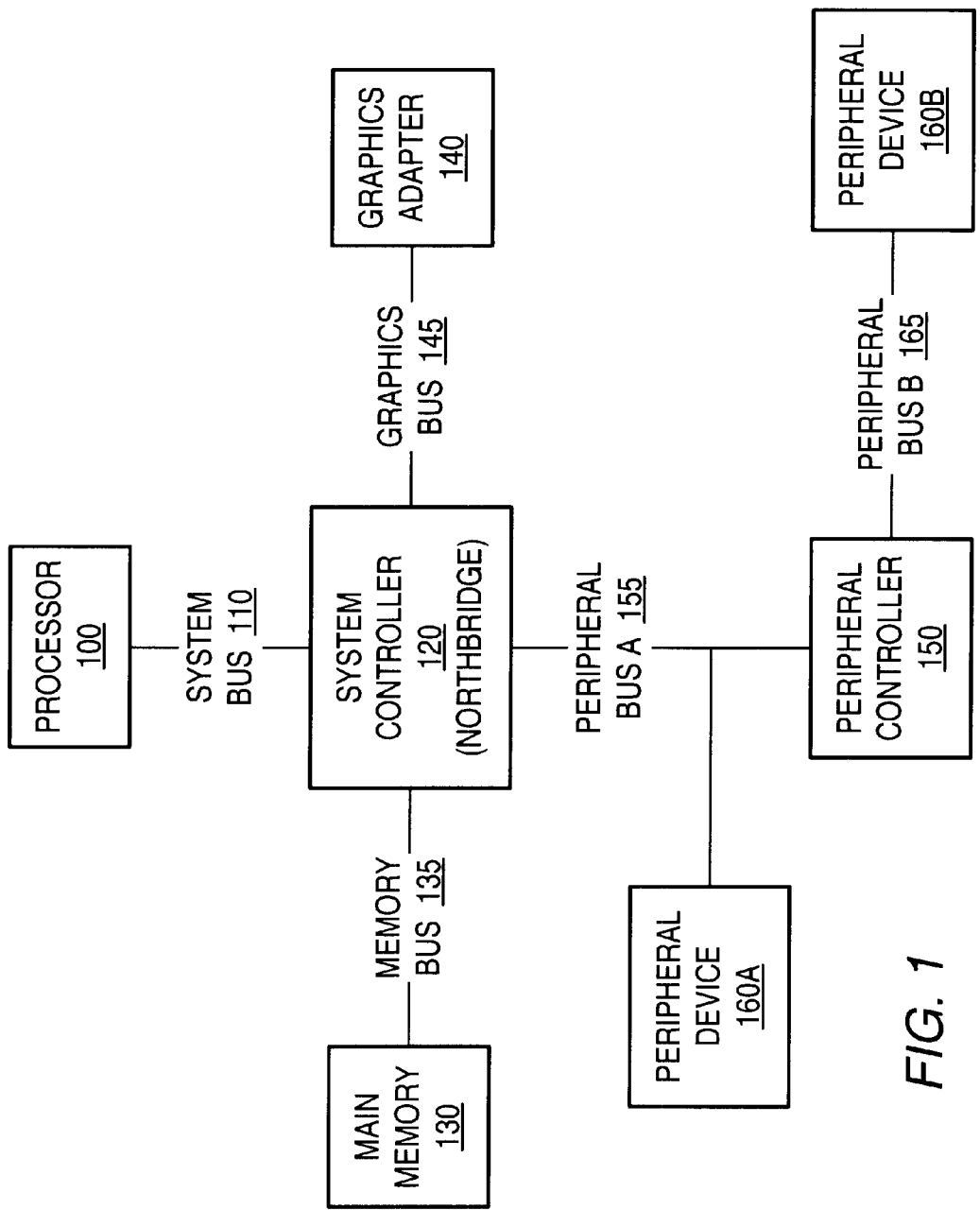
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer system is shown. The computer system includes a processor 100 coupled to a system controller 120 through a system bus 110. System controller 120 is coupled to main memory 130 through a memory bus 135. System controller 120 is also coupled to a graphics adapter 140 through a graphics bus 145. A peripheral controller 150 is coupled to system controller 120 through a peripheral bus A 155. Various peripheral devices such as 160A and 160B may be connected to peripheral bus A 155 and peripheral bus B 165 respectively.

In the illustrated embodiment, processor 100 is an example of an x86 class processor, such as an Athlon™ processor by Advanced Micro Devices, for example. In other embodiments, processor 100 may be any type of processor. System controller 120 may be a North Bridge style integrated circuit which may be part of a chip set used in conjunction with processor 100. Alternatively, in other embodiments, it is contemplated that system controller 120 may be part of the integrated circuit that includes processor 100.

During operation, processor 100 may have periods of idle time during which the system clock may continue to run but processor 100 is not processing data. As described above, logic transitions in a clocked system component may be a major source of power consumption in an integrated circuit. Thus, stopping the clock signal during idle periods is one method of saving power. In addition to processor 100, additional system power savings may be realized by stopping the internal clock of the chipsets and other peripheral components associated with processor 100.

As will be described in greater detail below, when idle periods are detected in the computer system, a clock stopping signal may be activated which may alert system controller 120 to stop its internal clock, thereby achieving additional system power savings.

Figure 2:
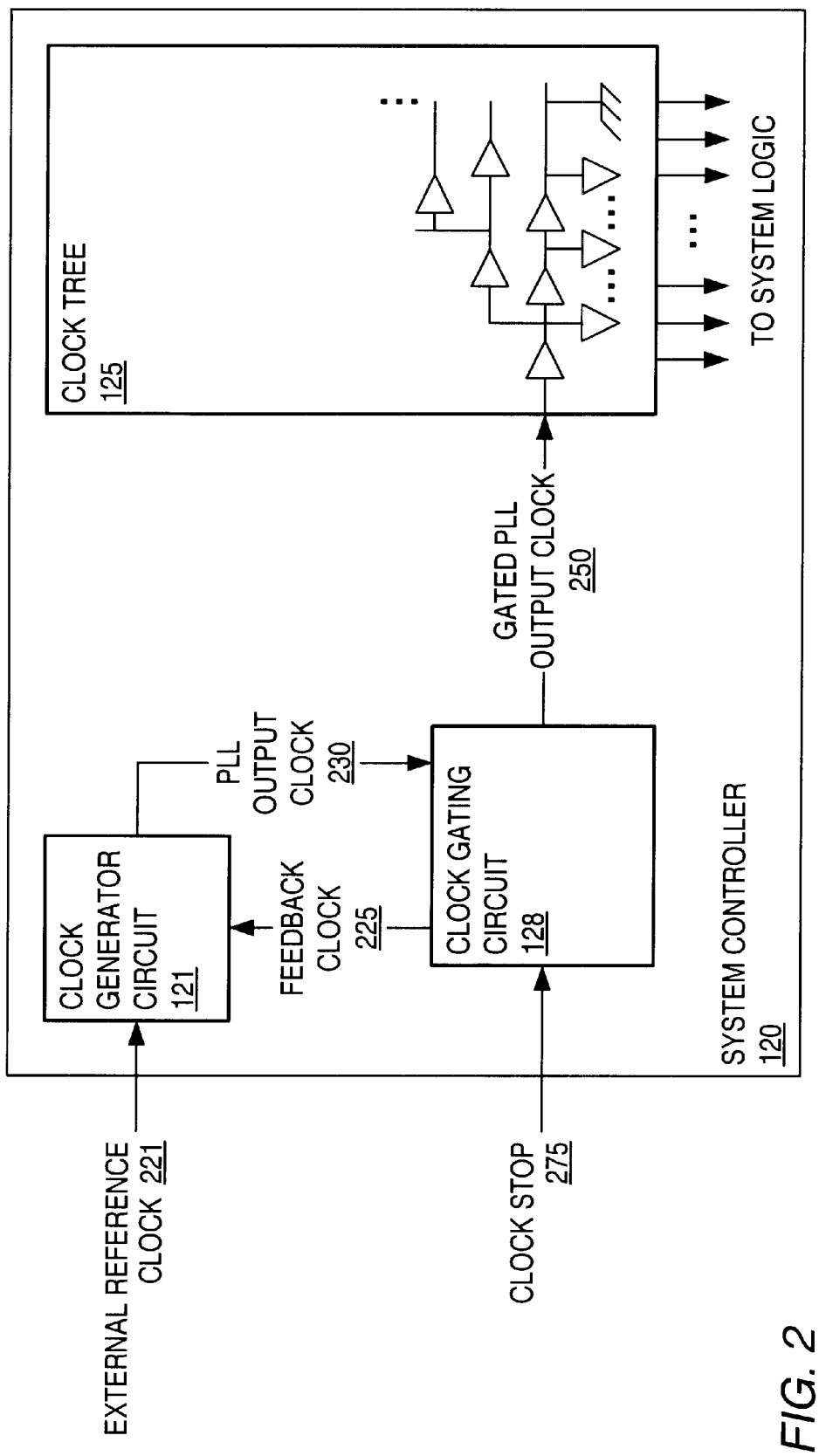
FIG. 2 is a block diagram of one embodiment of a system controller.

Referring to FIG. 2, a block diagram of one embodiment of a system controller 120 is shown. Circuit components that correspond to those shown in FIG. 1 are numbered identically for simplicity and clarity. System controller 120 includes a clock generator circuit 121 coupled to a clock tree 125. A clock gating circuit 128 is coupled between clock tree 125 and clock generator circuit 121. System controller 120 also receives an external reference clock 221 and a clock stop signal 275.

In the illustrated embodiment, clock generator circuit 121 is a locked loop circuit and may be a phase locked loop or a delay locked loop. Clock generator circuit 121 receives external reference clock 221 and generates a varying PLL output clock 230. Clock generator circuit 121 adjusts the phase and the frequency to lock a feedback clock signal to the phase and the frequency of external reference clock 221.

Clock tree 125 is representative of all of the clocked circuit elements that are connected to the clock and the distribution network that propagates PLL output clock 230 throughout system controller 120. In many circuit designs, the clock tree is a network that is carefully matched such that the delay in each branch of the clock tree is approximately equal to any other delay in any other branch. Thus, clock tree 125 is shown roughly as a network of buffers and branches which may ultimately go to system logic.

Clock gating circuit 128 receives PLL output clock 230 from clock generator circuit 121 and clock stop signal 275 from an external source. Clock gating circuit 128 is configured to inhibit PLL output clock 230 from clocking clock tree 125 in response to clock stop signal 275 becoming active. Otherwise, clock gating circuit 128 provides gated PLL output clock 250 to clock tree 125. Clock gating circuit 128 also provides feedback clock 225 to clock generator circuit 121. As will be described further below, clock gating circuit 128 includes circuitry that delays PLL output clock 230 by a predetermined amount resulting in a delayed version of PLL output clock 203 that is feedback clock 225.

Figure 3:
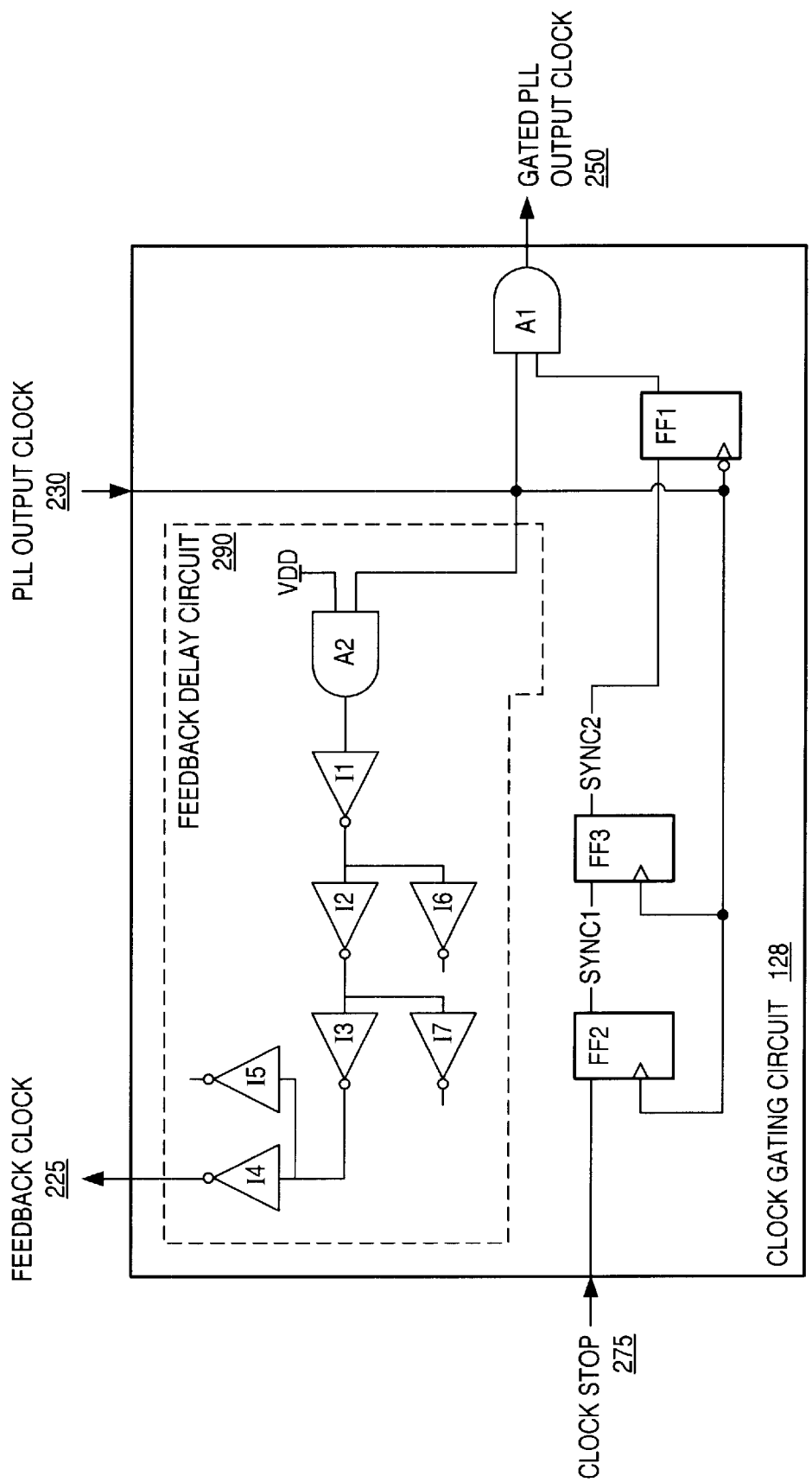
FIG. 3 is a schematic drawing of one embodiment of the clock gating circuit of FIG. 2.

Turning to FIG. 3, a schematic drawing of one embodiment of the clock gating circuit of FIG. 2 is shown. Circuit components that correspond to those shown in FIG. 2 are numbered identically for simplicity and clarity. Clock gating circuit 128 includes a feedback delay circuit 290 which generates feedback clock 225. Clock gating circuit 128 also includes a pair of flip-flops FF2 and FF3 which synchronize incoming clock stop signal 275. Flip-flop FF1 is coupled to the output of FF3. AND-gate A1 is coupled to FF1 and PLL output clock 230. In the illustrated embodiment, feedback delay circuit 290 includes inverter logic elements I1–I7 and AND-gate A2. It is contemplated that in other embodiments other numbers and combinations of these logic elements may be used.

Clock generator circuit 121 of FIG. 2 generates PLL output clock 230 using feedback clock 225. As gated PLL output clock 250 is propagated through clock tree 125, there is a finite delay associated with the layout of clock tree 125 and the number of logic elements that the PLL output clock passes through. In designs which provide feedback from the clock tree directly, the feedback signal includes the total phase delay of the clock tree (e.g. a feedback signal from one output of clock tree 125). Thus, in this particular embodiment, feedback delay circuit 290 of FIG. 3 generates feedback clock 225 with a delay that is substantially equal to the delay that would be created by clock tree 125 of FIG. 2. Thus to save power, clock gating circuit 128 may inhibit PLL output clock 230 from clocking clock tree 125 while clock gating circuit 128 continues to provide feedback clock 225, thereby allowing clock generation circuit 121 to continue to run. The operation of clock gating circuit 128 is described further below in conjunction with the description of FIG. 4.

Figure 4:
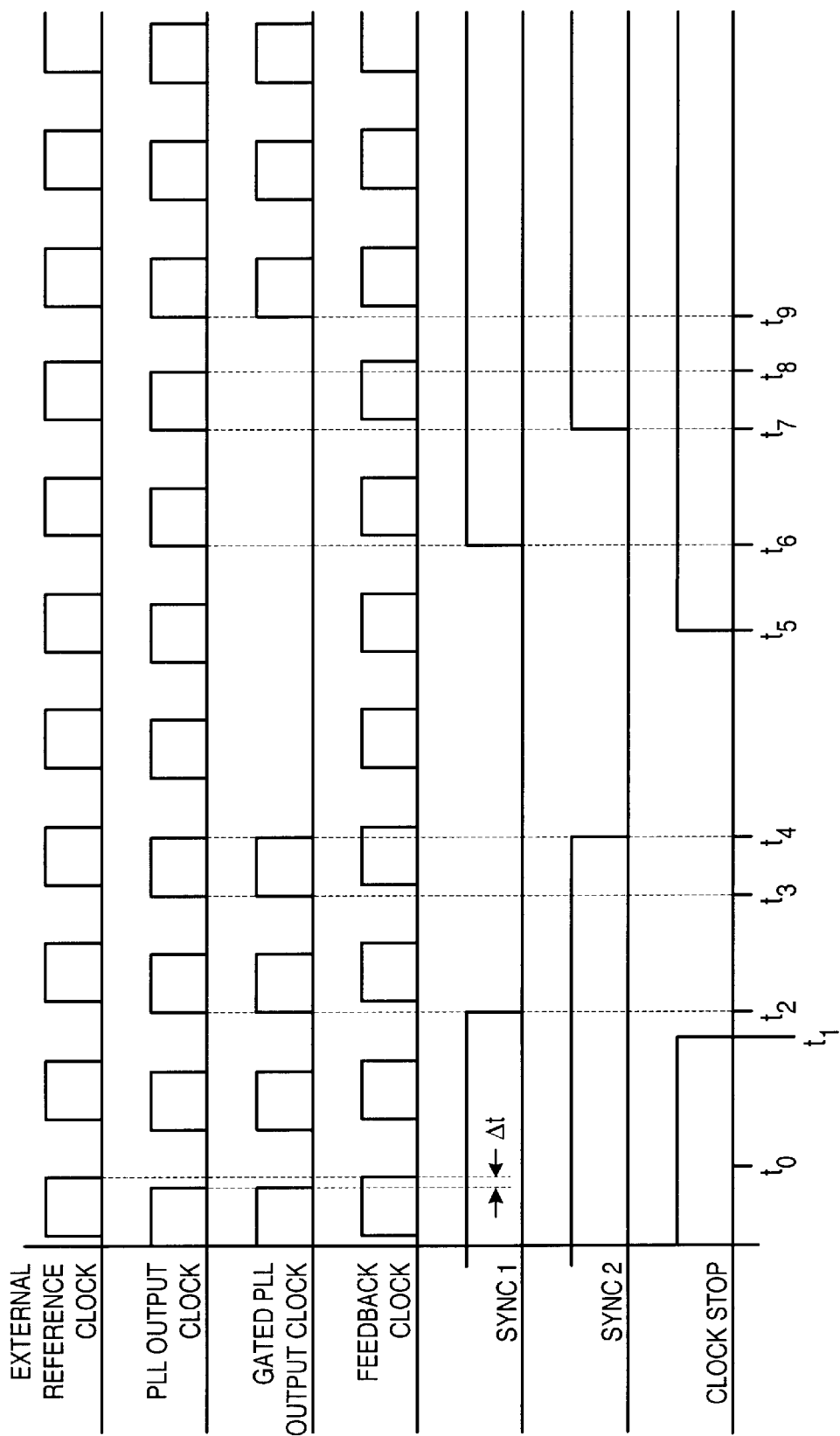
FIG. 4 is a timing diagram illustrating signal timing of one embodiment of the clock gating circuit of FIG. 3.

Turning to FIG. 4, a timing diagram illustrating signal timing of one embodiment of the clock gating circuit of FIG. 3 is shown. The timing diagram illustrates several signals on the Y-axis and time is shown on the X-axis. The first row is external reference clock 221. The second row is PLL output clock 230. The third row is gated PLL output clock signal 250. The fourth row depicts feedback clock 225. The fifth row shows a Sync 1 signal which is the output of FF2 of FIG. 3. The sixth row is a Sync 2 signal which is the output of FF3. The seventh row is clock stop signal 275 which is an active low signal in the illustrated embodiment.

Referring collectively to FIG. 2, FIG. 3 and FIG. 4, during operation, clock generator circuit 121 of FIG. 2 receives external reference clock 221 and generates PLL output clock 230 such that feedback clock 225 is in phase with and has a correct frequency relationship with external reference clock 221 as shown at timing mark t0. Clock gating circuit 128 receives PLL output clock 230 from clock generator circuit 121 and clock stop signal 275 from an external source. Flip-flops FF2–FF3 of FIG. 3 are clocked by the rising edge of PLL output clock 230 while flip-flop FF1 is clocked by the falling edge of PLL output clock 230. In this particular embodiment, clock stop signal 275 is an active low signal (i.e. a logic level of zero stops the clock). Thus a logic level of one present on clock stop signal 275 is propagated through FF1–FF3 and is present at one input of AND-gate A1. Each time PLL output clock 230 transitions, the output of A1 also transitions, thereby effectively passing PLL output clock 230 through A1 and out to clock tree 125 of FIG. 2 as a gated PLL output clock 250. This is illustrated in FIG. 4 during the first two cycles of PLL output clock 230 in row one. The gated PLL output clock 250 in row two is clocking along with PLL output clock 230. In addition, feedback clock 225 is also clocking at the same frequency as PLL output clock 230. However, feedback clock 225 is phase delayed by an amount shown in FIG. 4 as Δt. It is noted that in other embodiments, PLL output clock may be clocking at a different frequency than feedback clock 225. It is noted that in other embodiments, clock stop signal 275 may be an active high signal. It is contemplated that if clock stop signal 275 were an active high signal the polarity of corresponding logic gates may also need to be inverted.

As shown in FIG. 3, PLL output clock 230 is input to AND-gate A2. The output of A2 is provided to the input of inverter I1. Inverters I1–I7 and AND-gate A2 establish a logic gate network which provides gate delays of a known value. The phase delay Δt is derived in part by connecting the inverters and AND-gate A2 in a series-parallel configuration to provide a predetermined number of gate delays. However, the resistor-capacitor (RC) time constant resulting from the routing of the metal traces connecting the devices may become a significant source of signal delay as device geometries decrease. Therefore, in addition to providing a predetermined number of gate delays, the phase delay Δt is also derived by routing the traces in a predetermined manner such that the metal traces provide a calculated delay. Thus, the combination of the gate delays and the delays caused by signal trace routing is used to derive phase delay Δt. It is noted that Inverters I1–I7 and AND-gate A2 are shown for illustrative purposes only and that it is contemplated that any suitable number of logic gates may be used. It is further noted that sequential logic elements (e.g. flip-flops) may also be used in feedback delay circuit 290.

Since clock stop signal 275 is an asynchronous signal, it may become active at any time. For illustrative purposes, clock stop signal 275 becomes active at timing marker t1 of FIG. 4. On the next rising edge of PLL output clock 230, FF2 latches clock stop signal 275 at timing mark t2. On the next rising edge of PLL output clock 230, FF3 latches the output of FF2 at timing mark t3. On the next falling edge of PLL output clock 230, FF1 latches the Sync 2 signal thereby providing a logic zero at one input of AND-gate A1 at timing mark t4. This logic zero inhibits PLL output clock 230 from passing through A1. Thus, Gated PLL output clock 250 stops clocking after timing mark t4. It is noted that feedback clock 225 continues to clock during the time that gated PLL output clock 250 is inhibited, thereby allowing clock generator circuit 121 of FIG. 2 to continue to provide PLL output clock 230.

At timing mark t5, clock stop signal 275 becomes inactive and rises to a logic one. On the next rising edge of PLL output clock, FF2 latches the clock stop signal at timing mark t6. On the next rising edge of PLL output clock, FF3 latches the output of FF2 at timing mark t7. On the next falling edge of PLL output clock, FF1 latches the Sync 2 signal thereby providing a logic one at one input of AND-gate A1 at timing mark t8. This logic one allows PLL output clock 230 to pass through A1. Thus, Gated PLL output clock 250 begins clocking again at timing mark t9. Since clock generator circuit 121 of FIG. 2 continued to run during the gated clock time, there may be no delay associated with restarting the clock generator circuit 121.

Numerous variations and modifications will become apparent to those skilled in the art once the above disclosure is fully appreciated. It is intended that the following claims be interpreted to embrace all such variations and modifications.

What is claimed is:

1. A clock circuit comprising:
   a locked loop circuit configured to receive an input clock signal and to generate a PLL output clock depending upon a feedback signal;
   a clock tree distribution network coupled to said locked loop circuit and configured to convey the PLL output clock to a plurality of clocked circuit elements;
   a gating circuit coupled between said locked loop circuit and said clock tree distribution network and configured to selectively inhibit said PLL output clock from clocking said clock tree distribution network; and
   a feedback delay circuit coupled to receive said PLL output clock and configured to generate said feedback signal which represents a delayed version of said PLL output clock;
   wherein said delayed version of said PLL output clock is derived by propagating said PLL output clock through a predetermined number of feedback logic gates and by interconnecting said feedback logic gates using a signal trace routing having a predetermined phase delay; and
   wherein said feedback delay circuit is configured to provide said feedback signal during operation including when said gating circuit inhibits said PLL output clock from clocking said clock tree distribution network.

2. The circuit as recited in claim 1, wherein said delayed version of said PLL output clock is derived by adding a predetermined delay to said PLL output clock.

3. The circuit as recited in claim 2, wherein said predetermined delay is substantially equal to a delay caused by propagation of said PLL output clock through said clock tree distribution network.

4. The circuit as recited in claim 1 further comprising a synchronizing circuit coupled to said gating circuit and configured to receive and latch a gating control signal.

5. A system comprising:
   a processor; and
   a system controller coupled to said processor, said system controller including:
   a locked loop circuit configured to receive an input clock signal and to generate a PLL output clock depending upon a feedback signal;
   a clock tree distribution network coupled to said locked loop circuit and configured to convey the PLL output clock to a plurality of clocked circuit elements;
   a gating circuit coupled between said locked loop circuit and said clock tree distribution network and configured to selectively inhibit said PLL output clock from clocking said clock tree distribution network; and
   a feedback delay circuit coupled to receive said PLL output clock and configured to generate said feedback signal which represents a delayed version of said PLL output clock;
   wherein said delayed version of said PLL output clock is derived by propagating said PLL output clock through a predetermined number of feedback logic gates and by interconnecting said feedback logic gates using a signal trace routing having a predetermined phase delay; and
   wherein said feedback delay circuit is configured to provide said feedback signal during operation including when said gating circuit inhibits said PLL output clock from clocking said clock tree distribution network.

6. The system as recited in claim 5, wherein said delayed version of said PLL output clock is derived by adding a predetermined delay to said PLL output clock.

7. The system as recited in claim 6, wherein said predetermined delay is substantially equal to a delay caused by propagation of said PLL output clock through said clock tree distribution network.

8. The system as recited in claim 6 further comprising a synchronizing circuit coupled to said gating circuit and configured to receive and latch a gating control signal.

9. A method for inhibiting a clock signal, said method comprising:
   receiving an input clock signal and generating a PLL output clock depending upon a feedback signal;
   conveying said PLL output clock to a plurality of clocked circuit elements in a clock tree distribution network;
   selectively inhibiting said PLL output clock from clocking said clock tree distribution network;
   receiving said PLL output clock and generating said feedback signal which represents a delayed version of said PLL output clock;
   deriving said delayed version of said PLL output clock by propagating said PLL output clock through a predetermined number of feedback logic gates and by interconnecting said feedback logic gates using a signal trace routing having a predetermined phase delay; and
   providing said feedback signal during operation including when inhibiting said PLL output clock from clocking said clock tree distribution network.

10. The method as recited in claim 9, further comprising deriving said delayed version of said PLL output clock by adding a predetermined delay to said PLL output clock.

11. The method as recited in claim 10, wherein said predetermined delay is substantially equal to a delay caused by propagation of said PLL output clock through said clock tree distribution network.

12. The method as recited in claim 9, further comprising receiving and latching a gating control signal.

* * * * *

UNITED STATES PATENT AND TRADEMARK OFFICE
CERTIFICATE OF CORRECTION

PATENT NO.    : 6,624,681 B1                                       Page 1 of 1
DATED         : September 23, 2003
INVENTOR(S)   : Bruce A. Loyer et al.

It is certified that error appears in the above-identified patent and that said Letters Patent is hereby corrected as shown below:

<u>Column 6,</u>
Line 34, please change "claim 6" to -- claim 5 --.

Signed and Sealed this

Twenty-fourth Day of February, 2004

JON W. DUDAS
*Acting Director of the United States Patent and Trademark Office*